Sept. 25, 1962
C. E. CARLBERG
3,055,107
HEDGE AND TREE-LIMB TRIMMING SHEARS
Filed Aug. 15, 1961
2 Sheets-Sheet 2
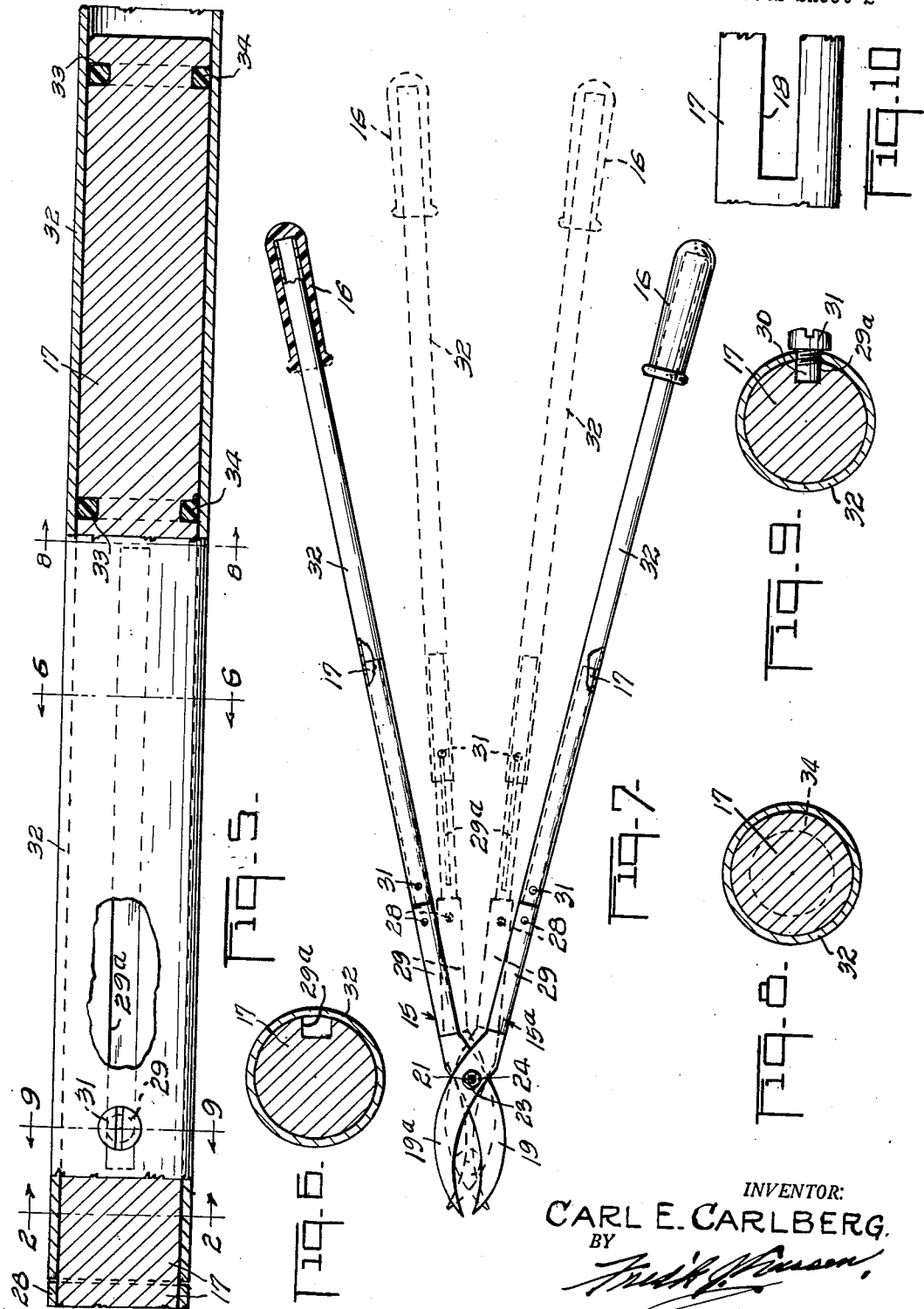
INVENTOR:
CARL E. CARLBERG.
BY
ATTORNEY.

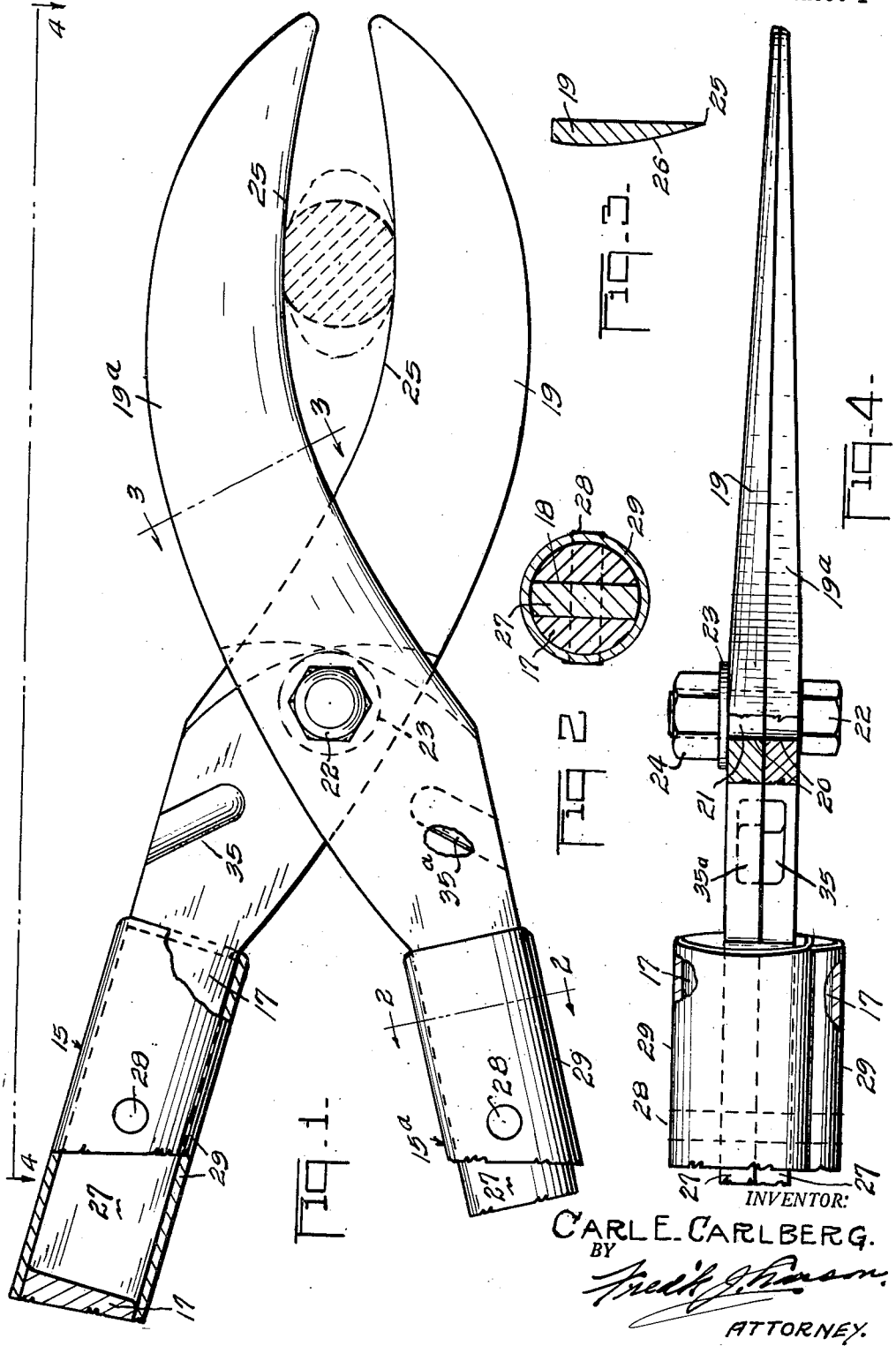

United States Patent Office 3,055,107
Patented Sept. 25, 1962

3,055,107
HEDGE AND TREE-LIMB TRIMMING SHEARS
Carl E. Carlberg, 103 176th Ave., Redington Shores, St. Petersburg, Fla.
Filed Aug. 15, 1961, Ser. No. 131,546
4 Claims. (Cl. 30—254)

My invention relates to improvements in hedge and tree-limb trimming shears.

An object of the invention is to provide a cutting-jaw or blade which has a relatively shallow concaved sharp cutting-edge.

Another object of the invention is to provide a cutting-jaw having a pivot-pin opening, and having a handle attaching shank integral with and extending from one end thereof, the cutting-jaw being curved along its cutting-edge and being curved outwardly on its outer face to add strength to the jaw, and the cutting-jaw having its shank extending at an angle from the jaw.

Another object of the invention is to provide a pair of relatively long overlapping plate-like jaw-members having, in assembly, opposed shallow concaved cutting or trimming edges running approximately full length of cutting-members from the common pivot therefore to the free outer ends thereof.

Another object of the invention resides in providing a pair of pivotally mounted and overlapping cutting-jaws each of which is tapered alike from the back edge thereof to the cutting-edge thereof, and also tapered from the adjacent pivot point thereof and beyond to the front end of the cutting-jaws.

A further object of the invention is to provide a longitudinally slidable handle on each cutting-jaw shank to shorten the operating handle and thereby reduce the cutting power when trimming hedges or cutting small diameter tree-limbs, and, lengthening the operating-handles by sliding the handles outwardly on the jaw-members to provide very powerful hand operated shears when it is desired for tree limbs and branches which vary in size from three-quarters of an inch in thickness to one and one-half inches in thickness, or more.

A still further object of my invention is to provide a pair of improved cutting-jaws for trimming hedges and tree branches without slipping off of the fibrous material, which will be comparatively inexpensive to make, and, which will exceed in the efficiency of operation with standard makes of hedge shears.

A still further object of the invention is to provide a tool of the character that will overcome certain practical objections to, and defects in, shear tools of present known constructions.

Other objects and advantages of my invention will be apparent during the course of the following description.

In the accompanying drawings, forming a part of this application, and in which like characters of reference are employed to designate like parts throughout the same.

Referring to the drawings:

FIGURE 1 is a top view, full size, of my improved cutting tool or hedge shears, the cutting-jaws being closed against fibrous material to be severed, and showing the operating handles as being partly broken away.

FIGURE 2 is a sectional view of the inner wooden handle, the cutting-jaw shank and the metal sleeve encircling the inner end portion of the wooden handle, taken on line 2—2 of FIGURE 1 of the drawings, looking in direction of the arrows.

FIGURE 3 is a sectional view of one of the cutting-jaws, clearly showing the cutting edge, taken on line 3—3 of FIGURE 1, looking in direction of the arrows.

FIGURE 4 is a side view of my hedge and tree limb trimming shears, taken on line 4—4 of FIGURE 1 of the drawings, looking in direction of the arrows.

FIGURE 5 is a side view, partly in section, of one of the wooden handles with both ends thereof broken away, and showing part of the metal extension handle which is slidably mounted on the wooden handle.

FIGURE 6 is a sectional view of one of the wooden handles and the slidably mounted metal extension handle mounted on the wooden handle, taken on line 6—6 of FIGURE 5 of the drawings, and looking in direction of the arrows, and showing an O-ring.

FIGURE 7 is a top plan view of the complete shears, reduced in size; the full lines showing the open position of the handles, and the dotted lines showing the closed positions of the handles with the extension handles as extended to their full open positions on the wooden handles.

FIGURE 8 is a sectional view of one of the wooden handles and the slidable metal handle slidably mounted thereon, taken on line 8—8 of FIGURE 5 of the drawings, looking in direction of the arrows.

FIGURE 9 is a sectional view, taken on line 9—9 of FIGURE 5 of the drawings and illustrating a stop-pin engaging in a longitudinal groove in the wall of the wooden handle.

FIGURE 10 is a fragmentary view of the inner end of one of the stationary wooden handles, showing the groove or slot in the wood to receive the metal shank of the cutting-jaw.

In the drawings, wherein for the purpose of illustration only, is shown a preferred embodiment of my invention, the numerals 15 and 15a designate, generally, a pair of like operating handles of my new and improved fibrous material cutting and trimming tool or more commonly called a hedge shears. Each handle includes a rubber hand-grip 16, and the handles are provided with cutting-jaws, as will be hereinafter clearly described.

The operating handles designated, generally, as 15 and 15a each embodies a wooden handle 17 which is circular in cross-section, as clearly shown in FIGURES 8 and 9 of the drawings and is provided along its medial line for a short distance from its inner end with a slot 18 of such length and width as to snugly receive and fit the shank end of the cutting-jaw, which shank will be described hereinafter.

It will be apparent that the configuration and construction of the cutting-jaw of the tool is important to the successful operation and use of the invention, and, it will be observed that the cutting-jaws or shear-blades designated 19, in assembly are overlapping normally at their rear ends, and each cutting-jaw is provided with a suitable diameter hole or opening 20 adapted to receive a common pivot-pin 21. The pivot-pin 21 is provided at one end with a suitable head 22 and the other end portion is screw-threaded. The pivot-pin projects through the openings 20 and through a lock-washer 23, and the screw-threaded end of the pivot-pin is provided with a suitable nut 24. The two cutting-jaws overlapped between the pivot-pin head 22 and the washer lockwasher 23 are held thereby in close relative shearing positions so that their sharp concaved cutting edges 25 will be firmly engaged when the two cutting-jaws are oscillated convergingly on the common pivot-pin 21 but still permitting ready oscillation of the cutting-jaws on the pivot pin, as will be apparent from FIGURES 1 and 4 of the drawings.

Each cutting-jaw 19 is formed from a flat piece of steel provided with a flat inner face and a convergingly curved outer face 26 extending from the back edge of the cutting-jaw to the cutting edge 25 thereof. The cutting edge is formed by curving the back face of the cutting-jaw, as shown in FIGURE 3 of the drawings. Other ways may be employed for providing the cutting-jaws 19 with the cutting edge 25, if so desired.

Further, the cutting edge 25 of each cutting-jaw is shallowly concaved or inwardly curved, and the greatest depth of the concaved cutting edge between the ends thereof, is in dimension, approximately one-eigth the distance of the actual cutting edge 25.

Also each cutting-jaw is provided with a flat substantially rectangular shank 27 of suitable length and width and substantially the same thickness as the cutting-jaws adjacent the pivot-pin opening 20 therein, and extending rearwardly from the pivot-pin opening in each cutting-jaw at a suitable angle to the curved medial line thereof.

The flat angularly directed shank 27 of each cutting-jaw is snugly fitted into the open ended slot 18 of each wooden handle 17, and each shank and wooden handle therefore is securely connected and held from displacement relative to each other by means of a suitable cross-pin 28, which pin also passes through opposite walls of a metal tube or sleeve 29 mounted on the metal shank receiving end of each wooden handle 17. The tube or sleeve 29 on each wooden handle is substantially one-third the length of the wooden handle.

The periphery of each wooden handle 17 may, or may not, be provided with a suitable longitudinal facial groove 29a adapted to receive the inner end 30 of a suitable stop-pin 30 having a head 31. The stop-pin 31 is screw-threaded into and through a screw-threaded opening in the wall of an aluminum extension handle 32. The groove and stop-pin limits the longitudinal movement of the extension handle 32 on the wooden handle 17.

When only the wooden handles 17 are used, the leverage thereof is sufficient to produce a cutting pressure to cut fibrous material such as hedges, and the like.

When the aluminum handles 32 which form adjustable extension handles mounted on the wooden handles 17, greater cutting power can be developed thus allowing one to use the cutting tool to cut or trim relatively thick and large tree limbs, which are tougher to cut and trim than hedges, and without the branches or tree limbs slipping out from between the cutting-jaws.

Still greater cutting power can be developed when the aluminum extension handles 32 which are slidably mounted on the wooden handles 17 are fully extended because the telescoped extension handles can be extended many inches.

It will be clearly apparent from FIGURE 7 of the drawings that much less power can be developed and exerted for cutting and trimming purposes when the slidable aluminum extension handles 32 mounted on the wooden handle 17 are not fully extended, and especially when they are removed from the wooden handles. It will be apparent that the slidable aluminum extention handles 32 can be readily and quickly mounted on the wooden handles 17, or removed therefrom.

Further, if so desired, the periphery of each wooden handle 17 may be provided with a pair of circular grooves 33 formed in the outer face of the wooden handle 17 near one end thereof. Each groove 33 may be provided with a suitable sized O-ring formed of rubber material. The rubber O-rings designated 34 will set up sufficient friction to each slidable aluminum extension handle 32 mounted on the wooden handles 17 to prevent the extension handles 32 from being too easily extended or turned on the wooden handles. When the facial groove 29 on the wooden handle 17, and the screw-threaded stop-pin is not used. The threaded opening can be used as a sight opening so one can see when the opening reaches the inner O-ring which will provide a visual warning that the aluminum slidable extension handle has been moved the limit of its sliding movement on the wooden handle without starting to separate from the wooden handle.

Further when it is not desired to use either the fiacial groove 29, the stop-pin 30, the circular grooves in the wooden-handle 17, the rubber O-rings 34 there is provided a nice snug sliding fit between the wooden-handles and the slidable extension handles 32 so as to set up sufficient friction between the two associated handle members that they will neither slide relative to each other without using some manual force to move the aluminum extension handle 32 longitudinally along the wooden-handle 17.

It will be here observed from FIGURES 1 and 4 of the drawings, especially FIGURE 4, that each cutting-jaw shank 27 is provided upon its inner face adjacent the back face thereof, between the pivot-pin 21 and the inner edge of each wooden-handle 17 with a suitable stop-lug 35 to limit closing movement of the cutting-jaws 19 and 19a. Each lug 35, may if desired, be welded to the inner faces of the shanks with a portion of each lug extending beyond the opposite cutting-jaw a suitable distance, as disclosed in FIGURE 4, something that is necessary to cause the lugs to engage the back face of the shank opposite each lug. This arrangement limits the closing movement of the cutting-jaws of the shears.

In practical use it has been found that when the cutting-jaws are of the size shown in FIGURE 1 and the wooden handles are substantially eleven inches long, and the extension-handles are substantially thirty-six inches long, a convenient size of tool is provided, so that even a woman or a child may use the tool. However other dimensions may be used. The tool is a general all around tool which can be used for many purposes on the premises.

It is to be understood that the form of my invention, herewith shown and described, is to be taken as an example of the same and that various changes in the shape, size and arrangement of the parts may be resorted to, without departing from the spirit of my invention or the scope of the appended claims.

Having thus described my invention, I claim:

1. In a tool of the class described, in combination, a pair of oppositely concaved overlapping shear-blades having a common pivot, said blades having opposed inwardly curved cutting-edges, manually actuated means for moving the cutting-edges of the shear-blades toward and away from each other convergingly, a shank integral with and extending from the inner end of each shear-blade at a suitable angle to the medial curved line of the shear-blades, said means including a wooden-handle, circular in cross-section, secured at one end portion thereof to each of the shanks, and an aluminum tubular extension handle of considerable length snugly and frictionally mounted on each wooden-handle.

2. In a tool as defined in claim 1, wherein the wooden-handles are each provided with a lonitudinal facial groove having a shoulder at each end, a stop-pin having screw-threaded connection with the wall of the slidable extension handles with the inner end portion of each stop-pin engaging in its respective facial groove.

3. In a tool as defined in claim 1, wherein the wooden-handles are each provided with a plurality of peripherial grooves, and a rubber O-ring positioned in each groove and frictionally engaging the inner wall of the slidable extension handle.

4. In a tool as defined in claim 1, wherein each tubular slidable extension is provided at its outer end portion with a suitable rubber hand-grip.

References Cited in the file of this patent

UNITED STATES PATENTS

| 106,253 | Bullard et al. | Aug. 9, 1870 |
| 2,733,506 | Wild | Feb. 7, 1956 |
| 2,794,250 | Bethune | June 4, 1957 |

FOREIGN PATENTS

| 210,156 | Switzerland | Sept. 2, 1940 |